United States Patent
Lim

(10) Patent No.: US 9,035,914 B2
(45) Date of Patent: May 19, 2015

(54) TOUCH SYSTEM INCLUDING OPTICAL TOUCH PANEL AND TOUCH PEN, AND METHOD OF CONTROLLING INTERFERENCE OPTICAL SIGNAL IN TOUCH SYSTEM

(71) Applicant: SAMSUNG DISPLAY CO., LTD., Yongin-si, Gyeonggi-do (KR)

(72) Inventor: Sang-Hyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 317 days.

(21) Appl. No.: 13/737,905

(22) Filed: Jan. 9, 2013

(65) Prior Publication Data
US 2014/0085266 A1  Mar. 27, 2014

(30) Foreign Application Priority Data
Sep. 21, 2012 (KR) .................. 10-2012-0105244

(51) Int. Cl.
G06F 3/042 (2006.01)
G06F 3/038 (2013.01)

(52) U.S. Cl.
CPC .............. *G06F 3/042* (2013.01); *G06F 3/0386* (2013.01); *G06F 2203/0384* (2013.01)

(58) Field of Classification Search
CPC ................ G06F 3/03; G06F 3/0317–3/0325; G06F 3/033; G06F 3/0354; G06F 3/03542; G06F 3/03545; G06F 3/03546; G06F 3/038–3/0386; G06F 3/042
USPC .......... 178/18.01–18.03, 18.09, 19.01, 19.05; 345/156, 173, 175, 180–183
See application file for complete search history.

(56) References Cited

U.S. PATENT DOCUMENTS

| | | | | |
|---|---|---|---|---|
| 6,124,848 A | * | 9/2000 | Ballare et al. | 345/179 |
| 6,377,249 B1 | * | 4/2002 | Mumford | 345/179 |
| 6,700,129 B1 | | 3/2004 | Usuda et al. | |
| 6,963,331 B1 | * | 11/2005 | Kobayashi et al. | 345/158 |
| 7,626,575 B2 | | 12/2009 | Cho et al. | |
| 2011/0096012 A1 | * | 4/2011 | Park et al. | 345/173 |
| 2011/0241989 A1 | | 10/2011 | Park et al. | |
| 2011/0279248 A1 | | 11/2011 | Ogawa | |
| 2012/0019462 A1 | | 1/2012 | Kim et al. | |

FOREIGN PATENT DOCUMENTS

| | | |
|---|---|---|
| JP | 3670896 B2 | 7/2005 |
| JP | 2011-239319 A | 11/2011 |
| KR | 1020060129624 A | 12/2006 |

(Continued)

*Primary Examiner* — Nathan Danielsen
(74) *Attorney, Agent, or Firm* — Christie, Parker & Hale, LLP

(57) ABSTRACT

A touch system including an optical touch panel and a touch pen, and a method of controlling an interference optical signal in the touch system. The optical touch panel device includes: a pattern analyzer detecting a pattern of an optical signal by scanning an optical touch panel, and comparing a detected pattern with patterns designated to button functions of a touch pen; a touch location detector recognizing a detected location of the optical signal as a touch location, if the detected pattern corresponds to a first pattern designated to a button function; an interference controller determining the optical signal as an interference signal, if a detected region of the optical signal exceeds a critical range; and a wireless transmitter outputting a control signal to the touch pen so that the touch pen may change the first pattern designated to the button function to a second pattern.

20 Claims, 9 Drawing Sheets

(56) References Cited

FOREIGN PATENT DOCUMENTS

| KR | 10-0930493 | 12/2009 |
| KR | 1020100023248 A | 3/2010 |
| KR | 10-2011-0111110 | 10/2011 |
| KR | 10-2012-0009715 | 2/2012 |

* cited by examiner

TOUCH SYSTEM INCLUDING OPTICAL TOUCH PANEL AND TOUCH PEN, AND METHOD OF CONTROLLING INTERFERENCE OPTICAL SIGNAL IN TOUCH SYSTEM

CROSS-REFERENCE TO RELATED PATENT APPLICATION

This application claims priority to and the benefit of Korean Patent Application No. 10-2012-0105244, filed on Sep. 21, 2012, in the Korean Intellectual Property Office, the disclosure of which is incorporated herein in its entirety by reference.

BACKGROUND

1. Field

The present invention relates to a touch system including an optical touch panel and a touch pen, and a method of controlling an interference optical signal in the touch system.

2. Description of the Related Art

In general, a touch screen is a screen that directly receives input data by recognizing a location of a human finger or an object contacting a particular location on the screen, and performing a predetermined process using software. To this end, a touch screen includes a touch panel attached to a general display panel, to perform its function.

Touch panels come in a variety of types, such as a resistive type, a capacitive type, a surface acoustic wave (SAW) type, an ultraviolet sensing type, and a piezoelectric type. Among these types, resistive type touch panels are widely employed as touch screens. Touch panels are implemented using a variety of methods. The price of a touch panel has been trending down, and thus, the use thereof has become popular. Also, multi-touch technology to recognize multiple contact points, and not simply one contact point, has enabled more diverse and natural operations. Recently, in-cell type touch screen panels, in which a touch sensor is integrated in pixels of a display panel, have been developed.

SUMMARY

One or more embodiments of the present invention provide a method of distinguishing an optical touch and a signal from each other by using optical signals having various patterns, and a method of reducing touch recognition errors by distinguishing interference optical signals.

According to an aspect of the present invention, there is provided an optical touch panel device including: a pattern analyzer configured to detect a pattern of an optical signal by scanning an optical touch panel and comparing a detected pattern with patterns designated to button functions of a touch pen; a touch location detector configured to recognize a detected location of the optical signal as a touch location when the detected pattern corresponds to a first pattern designated to a button function; an interference controller configured to determine whether or not the optical signal is an interference signal when a detected region of the optical signal exceeds a critical range; and a wireless transmitter configured to output a control signal to the touch pen so that the touch pen may change the first pattern designated to the button function to a second pattern.

The interference controller may be configured to change an operation clock of the optical touch panel when the optical signal is determined as the interference signal, and the wireless transmitter may be configured to output a notification of an operation clock change of the optical touch panel as the control signal.

The interference controller may be configured to change the first pattern to the second pattern when the optical signal is determined as the interference signal, and the wireless transmitter may be configured to output a pattern change notification as the control signal.

The first pattern and the second pattern may have an optical signal output period that is an integer multiple greater than or equal to a scanning period corresponding to an operation clock of the optical touch panel.

The wireless transmitter may be configured to output a synchronization signal, which includes information about an operation clock of the optical touch panel, to the touch pen to perform synchronization with the touch pen.

According to another aspect of the present invention, there is provided a touch pen including: a wireless receiver configured to receive a control signal from an optical touch panel requesting change of a first pattern, which corresponds to a pattern of an optical signal that is determined as an interference signal in an optical touch panel, designated to a button function to a second pattern; a pattern generator configured to change the first pattern designated to the button function to the second pattern according to the control signal; and a light-emitting device configured to generate an optical signal corresponding to the second pattern so that the optical touch panel performs the button function.

The wireless receiver may be configured to receive a notification of an operation clock change of the optical touch panel as the control signal, and the pattern generator may be configured to generate the second pattern according to the changed operation clock of the optical touch panel.

The wireless receiver may be configured to receive a notification of the change of the pattern designated to the button function as the control signal from the optical touch panel, and the pattern generator may be configured to change the first pattern designated to the button function to the second pattern.

The first pattern and the second pattern may have an optical signal output period that is an integer multiple greater than or equal to a scanning period corresponding to an operation clock of the optical touch panel.

The wireless receiver may be configured to receive a synchronization signal, which includes information about an operation clock of the optical touch panel, from the optical touch panel in order to perform synchronization with the optical touch panel.

According to another aspect of the present invention, there is provided a method of controlling an interference optical signal in an optical touch panel device, the method including: detecting a pattern of an optical signal by scanning an optical touch panel and comparing a detected pattern of the optical signal to patterns designated to button functions of a touch pen; recognizing a detected location of the optical signal as a touch location when the detected pattern corresponds to a first pattern designated to a button function; determining the optical signal is an interference signal when a detected region of the optical signal exceeds a critical range; and wirelessly outputting a control signal to the touch pen so that the touch pen changes the first pattern designated to the button function to a second pattern.

The determining of the interference signal may include changing an operation clock of the optical touch panel when the optical signal is determined as the interference signal, and the outputting of the control signal may include outputting an operation clock change notification of the optical touch panel as a control signal.

The determining of the interference signal may include changing the first pattern to the second pattern when the optical signal is determined as the interference signal, and the outputting of the control signal may include outputting a pattern change notification as the control signal.

The first pattern and the second pattern may have an optical signal output period that is an integer multiple greater than or equal to a scanning period corresponding to an operation clock of the optical touch panel.

The method may further include wirelessly outputting a synchronization signal including information about an operation clock of the optical touch panel to the touch pen to perform synchronization with the touch pen.

According to another aspect of the present invention, there is provided a method of controlling an interference optical signal in a touch pen, the method including: wirelessly receiving a control signal requesting a change of a first pattern, which corresponds to a pattern of an optical signal that is determined as an interference signal in an optical touch panel, designated to a button function to a second pattern from the optical touch panel; changing the first pattern designated to the button function to the second pattern according to the control signal; and generating an optical signal corresponding to the second pattern so that the optical touch panel performs the button function.

The receiving of the control signal may include receiving an operation clock change notification of the optical touch panel from the optical touch panel, and the changing of the pattern may include generating the second pattern according to the changed operation clock of the optical touch panel.

The receiving of the control signal may include receiving a change notification of the pattern designated to the button function from the optical touch panel, and the changing of the pattern may include changing the first pattern designated to the button function to the second pattern.

The first pattern and the second pattern may have an optical signal output period that is an integer multiple greater than or equal to a scanning period that is based on an operation clock of the optical touch panel.

The method may further include receiving a synchronization signal including information about an operation clock of the optical touch panel from the optical touch panel in order to perform synchronization with the optical touch panel.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION

Figure 1:
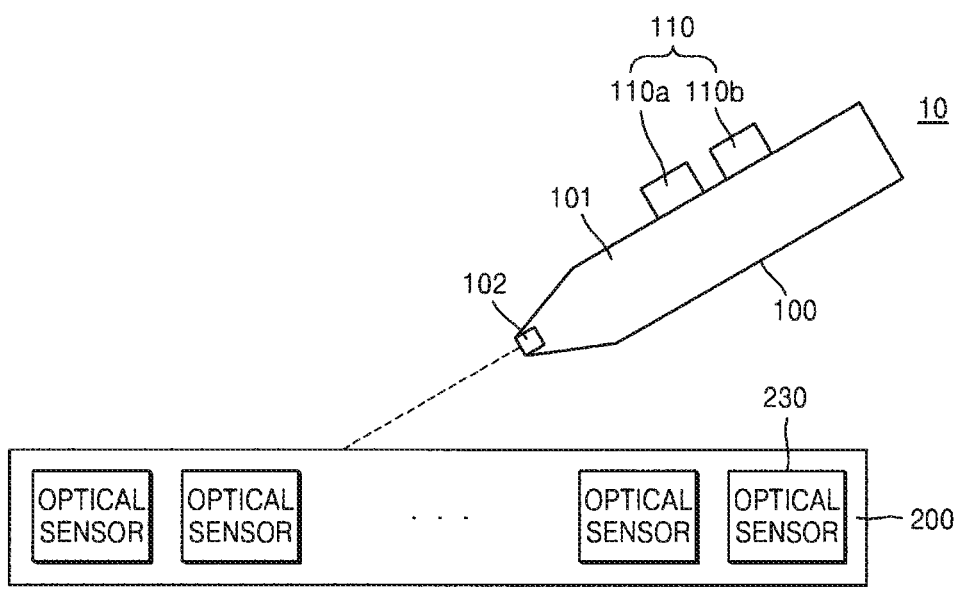
FIG. 1 is a diagram schematically illustrating a touch system according to an embodiment of the present invention.

As the present invention allows for various changes and numerous embodiments, only particular embodiments will be illustrated in the drawings and described in detail in the written description. However, this should not limit the present invention to these particular embodiments, and all changes, equivalents, and substitutes that do not depart from the spirit and technical scope of the present invention are encompassed in the present invention. In the description of the present invention, certain detailed explanations of related art are omitted when it is deemed that they may unnecessarily obscure features or aspects of the present invention.

Although the terms "firs", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section.

The terminology used herein is for the purpose of describing particular embodiments only and should not be limiting of the present invention. As used herein, the singular forms "a", "an" and "the" may include the plural forms as well, unless the context clearly indicates otherwise. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to accompanying drawings.

FIG. 1 is a diagram schematically illustrating a touch system 10 according to an embodiment of the present invention.

Referring to FIG. 1, the touch system 10 includes an optical touch panel device 200 and a touch pen 100.

The optical touch panel device 200 may perform the functions of a touch panel by sensing light. The optical touch panel device 200 includes a plurality of pixels arranged in a matrix form, and some of the pixels may include a display pixel for displaying images and an optical sensing circuit unit for sensing incident light. In another embodiment, every pixel may include a display pixel unit and an optical sensing circuit unit. However, the optical sensing circuit unit may be included in fewer than all of the pixels in order to increase a display resolution. In general, a ray of light irradiated on the optical touch panel for optically controlling the touch is larger than one pixel, and thus, when a light sensing circuit unit is included in fewer than all of the pixels, an incident location of the light may be precisely defined. The optical sensing circuit unit may include an optical sensor 230, such as a photodiode or an optical sensing thin film transistor (TFT). The optical touch panel device 200 may be applied to flat panel displays such as a liquid crystal display (LCD) or an organic light-emitting diode (OLED) display.

In the embodiment of FIG. 1, an in-cell type touch panel, in which display pixels and optical sensors are integrated, is exemplary shown. However, the optical sensing circuit unit may be separated from the display pixel, and thus, an additional optical touch panel including the optical sensing circuit unit may be configured. In this case, the optical touch panel including the optical sensing circuit unit may be attached to an additional display panel including the display pixel unit.

The optical touch panel device 200 may recognize a touch when the touch pen 100 touches the display screen and an optical signal of a certain pattern is remotely received from the touch pen 100. The optical touch panel device 200 may perform a corresponding function by receiving a touch.

The touch pen 100 may control the optical touch panel device 200 to perform a desired function by remotely transmitting the optical signal to the optical touch panel device 200, as well as by inputting touch coordinates by approaching or contacting the display screen. The touch pen 100 may be an optical stylus pen.

The touch pen 100 may include a main body 101 formed as a pen that can be held by a user's hand, a nib 102 at an end portion of the main body 101, and a button unit 110 including one or more buttons 110*a* and 110*b* on an outer circumference of the main body 101.

The nib 102 may slide over the display screen while contacting the display screen of the optical touch panel device 200.

The buttons 110*a* and 110*b* of the button unit 110 may be push-type switches that transmit control signals to the optical touch panel device 200 in order to make the optical touch panel device 200 perform certain operations and functions when the user pushes the buttons 110*a* and 110*b*. For example, the buttons 110*a* and 110*b* may, for example, realize a function of changing the display screen to display prior and next images, a volume up/down function, a screen reduction/enlarge function, or a touch recognition on/off function. In the embodiment shown in FIG. 1, two buttons are shown; however, more or fewer buttons may be provided.

Figure 2A:
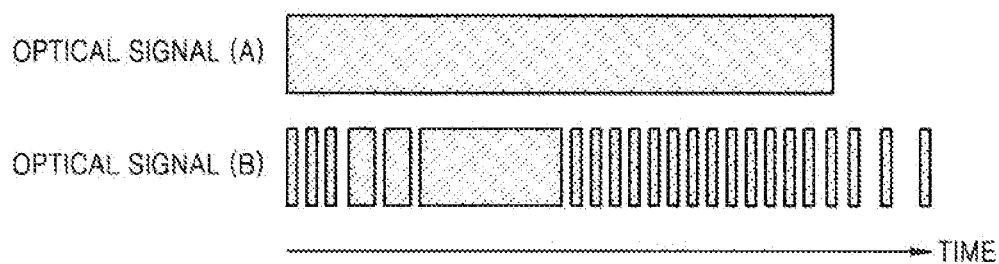
FIGS. 2A and 2B are diagrams illustrating examples of optical signals generated by a touch pen according to an embodiment of the present invention.
Figure 2B:
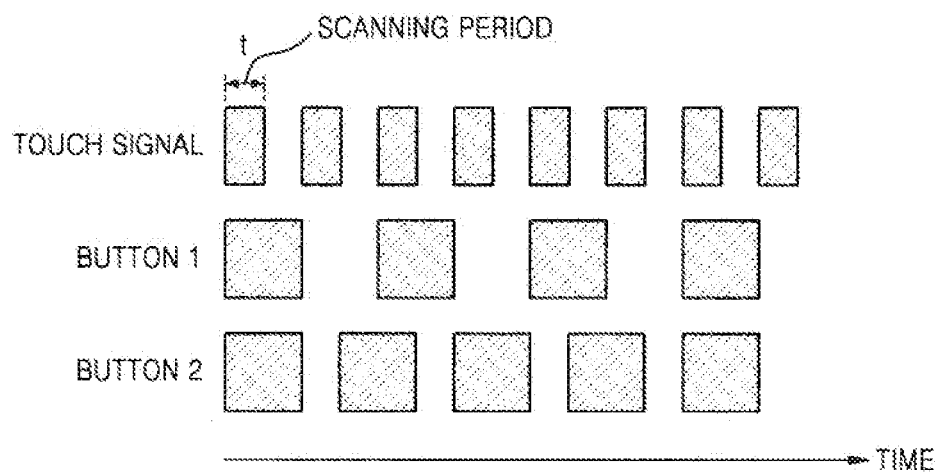

FIGS. 2A and 2B are diagrams showing examples of the optical signals generated by the touch pen 100.

Referring to FIGS. 2A and 2B, the optical touch panel device 200 recognizes an optical signal (A), which is external light or internal light, as an optical signal having no intermissions or an optical signal with an irregular period. The optical touch panel device 200 recognizes an optical signal (B) generated by the touch pen 100 as an optical signal with a certain pattern having a light output period that is an integer multiple longer than or equal to a scanning period t.

When the touch pen 100 touches the display screen, the optical touch panel device 200 scans the optical touch panel according to the scanning period t and detects a pattern of the sensed optical signal. Accordingly, a touch signal generated by a simple touch operation of the touch pen 100 has a pattern according to the scanning period t.

The touch pen 100 may set various button functions according to various combinations of pushing the buttons 100*a* and 110*b*, for example, pushing the buttons 110*a* and 110*b* once, pushing the buttons 110*a* and 110*b* once for a long time or short time, or pushing the buttons 110*a* and 110*b* twice, and may set optical signal patterns corresponding to each of the functions. For example, a first optical signal pattern may be designated to a function of changing the screen to a previous image by pushing the button 110*a*, and a second optical signal pattern may be designated to a function of changing the screen to a next image by pushing the button 110*b*.

Here, the optical pattern designated to each function has a light output period that is an integer multiple longer than or equal to the scanning period t. When a certain function of the button of the touch pen 100 is selected by the user, the optical signal having the pattern designated to the certain function is incident on the optical touch panel of the optical touch panel device 200. For example, when the button 110*a* is selected, the touch pen 100 may output optical signals at an interval 2t for a period of twice (2t) of the scanning period t. When the button 110*b* is selected, the touch pen 100 may output optical signals at an interval t for a period of twice 2t of the scanning period t.

The optical signal patterns shown in FIGS. 2A and 2B are examples, and the present invention is not limited thereto. That is, each of the various functions may be distinguished by using various patterns.

Figure 3:
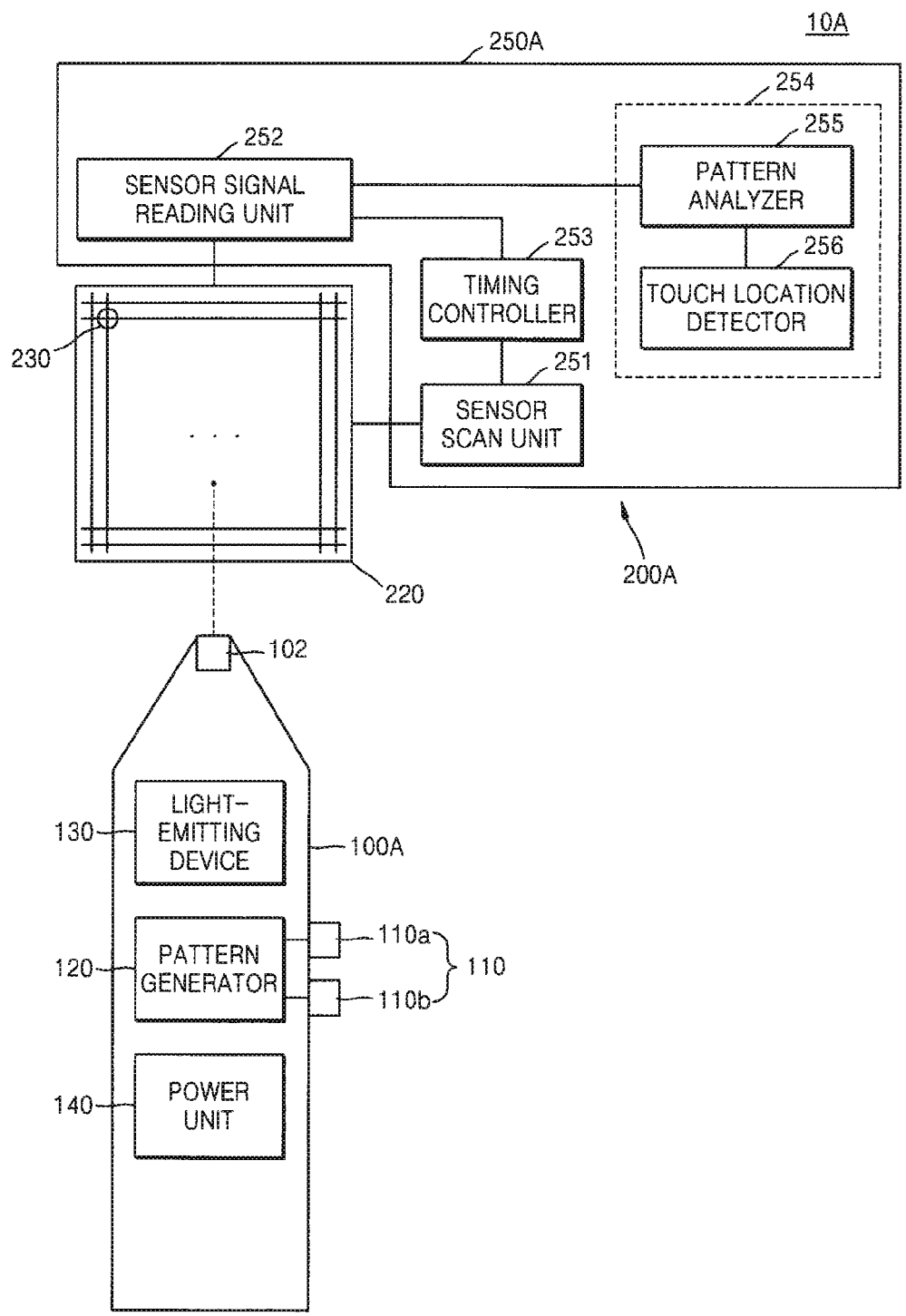
FIG. 3 is a diagram schematically illustrating operations of a touch system according to an embodiment of the present invention.

FIG. 3 is a diagram schematically illustrating operations of a touch system 10A according to an embodiment of the present invention.

Referring to FIG. 3, the touch system 10A may include a touch pen 100A and an optical touch panel device 200A.

The touch pen 100A may include a pattern generator 120, a light-emitting device 130, and a power unit 140.

The pattern generator 120 may generate an optical signal pattern designated for a certain button function when the certain button function is selected by a user pushing buttons 110*a* and 110*b*. Operation clocks are an integer multiple greater than or equal to a scanning period t that corresponds to (or is based on) operation clocks of an optical touch panel 220. Therefore, the pattern generator 120 may generate an optical signal pattern that is an integer multiple greater than or equal to the scanning period t based on the operation clocks of the optical touch panel 220, as shown in FIG. 2B.

The light-emitting device 130 may generate the optical signal according to the optical signal pattern designated to each of the button functions by the control of the pattern generator 120, and may output the optical signal having the pattern to the optical touch panel 220 via the nib 102.

The power unit 140 may apply an electric power to each of the components, such as the pattern generator 120 and the light-emitting device 130, of the touch pen 100A.

The optical touch panel device 200A may include the optical touch panel 220 and a panel driving unit 250A controlling the driving and touch recognition of the touch panel 220.

The optical touch panel 220 may include a plurality of scan lines that are connected to a sensor scan unit 251, a plurality of output lines that are connected to a sensor signal reading unit 252, and a plurality of sensing cells, including the optical sensors 230, at locations where the plurality of scan lines and the plurality of output lines cross each other.

The panel driving unit 250A may include the sensor scan unit 251, the sensor signal reading unit 252, a timing controller 253, and an optical sensing controller 254.

The sensor scan unit 251 may provide the optical sensors 230 with scanning signals at the scanning period according to the operation clock of the optical touch panel 220 through the scan lines.

The sensor signal reading unit 252 may read out a photosensitive signal acquired by the optical sensor 230 selected by the scanning signal through an output line, and may transmit the photosensitive signal to the optical sensing controller 254.

The timing controller 253 may control operating timings of the sensor scan unit 251 and the sensor signal reading unit 252 according to the operation clock of the optical touch panel 220.

The optical sensing controller 254 may calculate the pattern of the photosensitive signal and a touch location based on the photosensitive signal. The optical sensing controller 254 may include a pattern analyzer 255 and a touch location detector 256.

Various optical components may be incident on the optical touch panel 220. External incident light, such as sunlight or illumination, and internal light emitted to display images are incident on the optical touch panel 220. Among the lights, in order to selectively recognize an effective optical signal generated by the touch pen 100A as a touch location, pattern analysis of the optical signal may be used.

The pattern analyzer 255 may detect the pattern of the sensed optical signal by analyzing the sensed optical signal, and may determine whether the optical signal is the touch signal from the touch pen 100A or a button function signal of the touch pen 100A according to the detected pattern of the optical signal. The pattern analyzer 255 may store optical signal patterns corresponding to button function signals (e.g., predetermined button function signals) of the touch pen 100A, and may determine whether or not the optical signal corresponds to a button function signal by comparing the stored optical signal pattern with the detected pattern of the optical signal.

The touch location detector 256 may determine the location where the optical signal having the detected pattern is detected as the touch location in a case where the detected pattern of the optical signal is determined as the button function signal or the touch signal by the pattern analyzer 255.

The optical sensor 230 may be affected by the external light and internal light (light emitted from the light emission unit of the display device), and the external and internal lights operate as noise to the optical sensor 230. Therefore, according to the embodiments of the present invention, an optical signal with a certain pattern that is distinguished from the external light and the internal light is set between the touch pen 100A and the optical touch panel 220, and thus, a touch system that is not affected by the external and internal light may be realized. Also, pointing, touching, and button functions may be realized by using the optical signal without using an additional channel, such as via wires or wirelessly (for example, a radio frequency (RF) signal). In addition, a synchronization process is not used, and costs for forming an additional channel may be saved.

Figure 4:
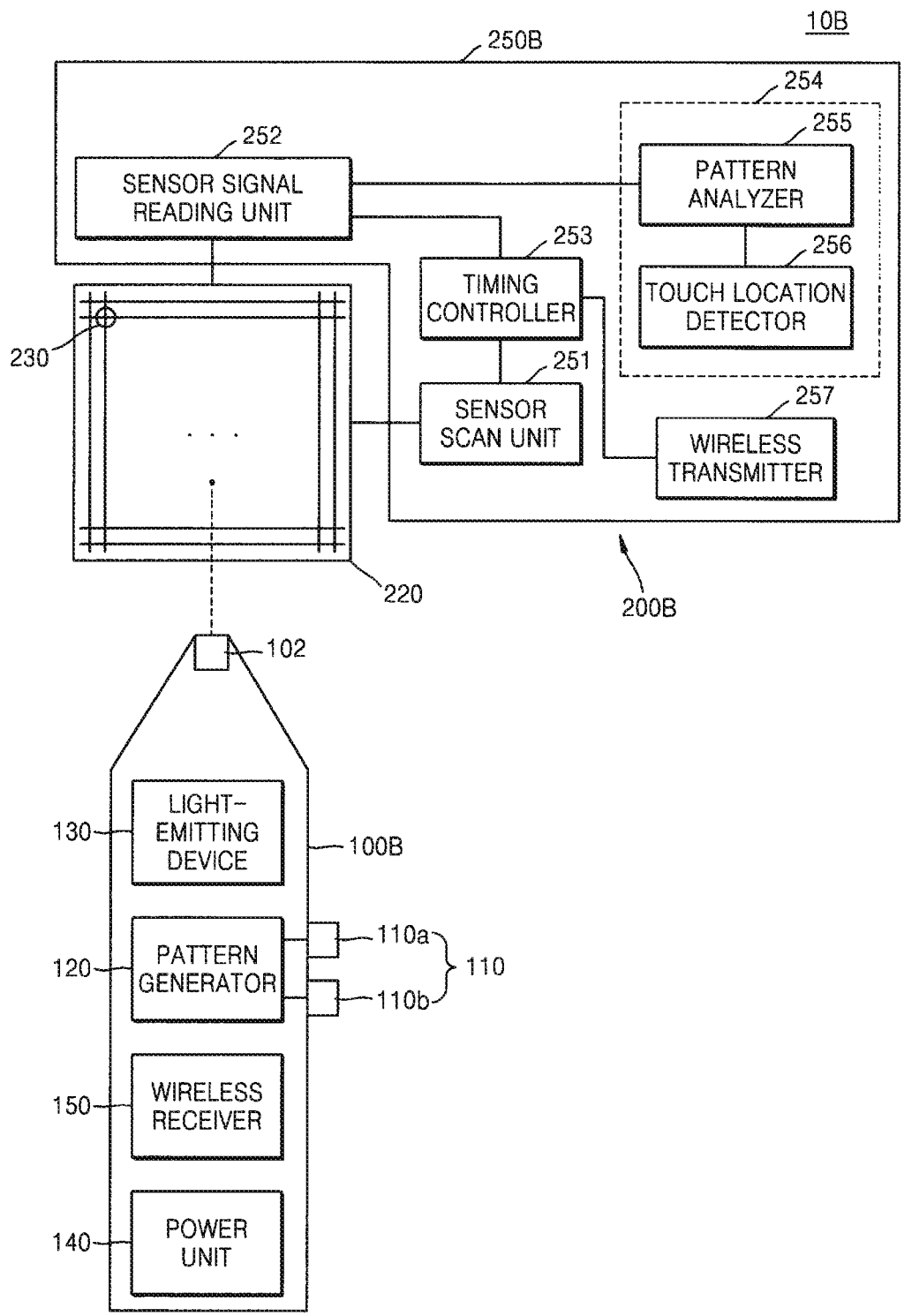
FIG. 4 is a diagram schematically illustrating operations of a touch system according to another embodiment of the present invention.

FIG. 4 is a schematic diagram illustrating operations of a touch system 10B according to another embodiment of the present invention.

Referring to FIG. 4, the touch system 10B includes a touch pen 100B and an optical touch panel device 200B.

The touch pen 100B may include the pattern generator 120, the light-emitting device 130, the power unit 140, and a wireless receiver 150. The optical touch panel device 200B may include the optical touch panel 220 and a panel driving unit 250B. The panel driving unit 250B may include a sensor scanning unit 251, a sensor signal reading unit 252, a timing controller 253, a photosensitive controller 254, and a wireless transmitter 257.

As shown in FIG. 4, the touch pen 100B and the panel driving unit 250B of the present embodiment are different from the touch pen 100A and the panel driving unit 250A of FIG. 3 in that the touch pen 100B includes the wireless receiver 150 and the panel driving unit 250B includes the wireless transmitter 257. Other components have functions that are the same as or similar to those of the corresponding components shown in FIG. 3, and thus, detailed descriptions thereof are given by way of reference to the previous embodiments. Hereinafter, differences will be described below.

The touch pen 100B and the optical touch panel device 200B may perform synchronization through a wireless channel. Here, because the electric power applied to the optical touch panel device 200B is greater than that of the touch pen 100B, the optical touch panel device 200B includes the wireless transmitter 257 having a large power consumption and the touch pen 100B includes the wireless receiver 150.

The timing controller 253 of the panel driving unit 250B may generate a synchronization signal including operation clock information of the optical touch panel 220, and the wireless transmitter 257 may transmit the synchronization signal to the touch pen 100B via the wireless channel.

The wireless receiver 150 of the touch pen 100B may receive the synchronization signal and may transmit the received synchronization signal to the pattern generator 120. The pattern generator 120 may generate an optical signal pattern designated for each of the button functions at a period that is an integer multiple greater than or equal to the scanning period t, which corresponds to the operation clock of the optical touch panel 220, as shown in FIG. 2B. The light-emitting device 130 may generate the optical signal according to the optical signal pattern designated for each of the button functions by the control of the pattern generator 120, and may output the optical signal to the optical touch panel 220 via the nib 102.

The power unit 140 of the touch pen 100B may apply an electric power to each of the components, for example, the pattern generator 120, the light-emitting device 130, and the wireless receiver 150, of the touch pen 100B.

The touch system 10A shown in FIG. 3 is an asynchronous touch system, in which the operation clock of the touch pen 100A is an integer multiple greater than or equal to the scanning period t, which is based on the operation clock of the optical touch panel device 220A. However, the touch system 10B shown in FIG. 4 may perform the synchronization between the touch pen 100B and the optical touch panel device 200B via an additional wireless channel. Accordingly, a universal optical touch pen may be applied to an optical touch panel of another type.

Figure 5:
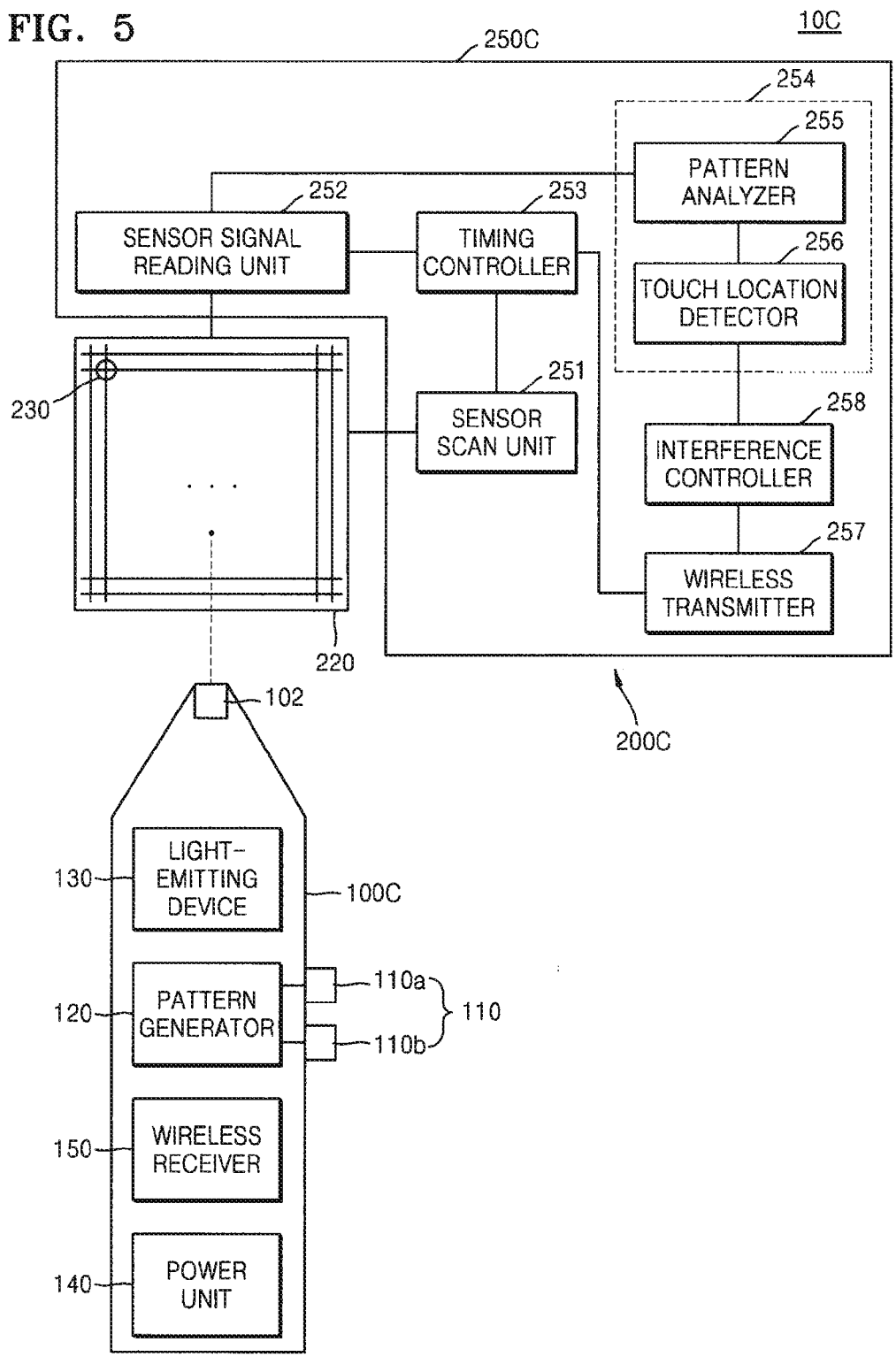
FIG. 5 is a diagram schematically illustrating operations of a touch system according to another embodiment of the present invention.

FIG. 5 is a diagram schematically illustrating operations of a touch system 10C according to another embodiment of the present invention.

Referring to FIG. 5, the touch system IOC includes a touch pen 100C and an optical touch panel device 200C.

The touch pen 100C includes the pattern generator 120, the light-emitting device 130, the power unit 140, and the wireless receiver 150. The optical touch panel device 200C includes the optical touch panel 220 and a panel driving unit 250c. The panel driving unit 250C includes the sensor scanning unit 251, the sensor signal reading unit 252, the timing controller 253, the photosensitive controller 254, the wireless transmitter 257, and an interference controller 258.

The touch system 10C shown in FIG. 5 is different from the touch system 10B of FIG. 4 in that the panel driving unit 250C includes the interference controller 258 so that an interference control signal is transmitted between the wireless transmitter 257 and the wireless receiver 150. Other components of the touch system 10C have the same or similar functions to those of the corresponding components shown in FIGS. 2A, 2B, and 4, and detailed descriptions thereof are given by way of references to the previously described embodiments. The above difference will be described below.

As shown in FIG. 2A, a general optical signal does not have periodicity. However, a set test pattern or an optical signal having a similar characteristic to that of the optical signal generated by the touch pen 100C may be induced in a certain environment. Such an optical signal operates as an interference signal that may cause a wrong recognition and an error of performing button functions of the optical touch panel device 200C. The optical signal generating the above interference is detected from a wide area that is greater than an input area of the touch pen 100C, that is, an area that the nib 102 contacts the optical touch panel 220 and an area from which the optical signal output from the nib 102 is detected.

Therefore, after the touch location detector 256 determines the touch location of the sensed optical signal, the interference controller 258 compares the area of the region where the sensed optical signal is detected with a critical range. The critical range may be set based on an input size of the touch pen 100C. The interference controller 258 may determine the sensed optical signal as the interference optical signal when the area of the detected region is greater than the critical range.

When the sensed optical signal is determined as the interference signal, the interference controller 258 generates a control signal for requesting the touch pen 100C to change the pattern of a certain button function to which the optical signal having the corresponding pattern to that of the sensed optical signal is designated. The control signal is output to the touch pen 100C via the wireless transmitter 257. The touch pen 100C changes the pattern of the certain button function according to the control signal.

According to an embodiment, if the sensed optical signal is determined as an interference signal, the interference controller 258 changes the operation clock of the optical touch panel 220. In addition, the interference controller 258 generates an operation clock change notification as a control signal. The control signal is output to the touch pen 100C via the wireless transmitter 257. The scanning period of the optical touch panel 220 is changed by the change of the operation clock of the optical touch panel 220. Accordingly, the patterns of the touch signal and the button function signal, which are an integer multiple greater than or equal to the scanning period that is stored, are changed.

The touch pen 100C may receive the control signal through the wireless receiver 150 and may transmit the received control signal to the pattern generator 120.

The pattern generator 120 may generate a pattern based on the changed operation clock of the optical touch panel 220 to change the pattern designated to the certain button function. Accordingly, the touch pen 100C may generate the optical signal pattern to suitably be an integer multiple of the changed scanning period. For example, the pattern generator 120 may change a first pattern that matches with the integer multiple of the scanning period before changing to a second pattern that matches with the integer multiple of the scanning period after changing. Accordingly, new optical signal patterns for the touch signal and the button function signal may be set between the touch pen 100C and the optical touch panel device 200C. Therefore, the optical touch panel device 200C may prevent the wrong recognition of the interference optical signal having the first pattern that matches with the scanning period before the changing as the touch signal or the button function signal.

According to another embodiment, when the sensed optical signal is determined as an interference signal the interference controller 258 changes a pattern of a certain button function stored in the optical touch panel device 200C to another pattern. In addition, the interference controller 258 generates a pattern change notification as a control signal. The control signal is output to the touch pen 100C via the wireless transmitter 257. For example, the optical touch panel device 200C may change a first pattern designated for a first button function to a second pattern that is not used.

The touch pen 100C may receive the control signal through the wireless receiver 150 and may transmit the control signal to the pattern generator 120. The pattern generator 120 may change the pattern previously designated to the certain button function to another pattern, like the optical touch panel device 200C. For example, as in the optical touch panel device 200C, the pattern generator 120 may change the first pattern designated for the first button function to the second pattern. Accordingly, new optical patterns for the touch signal and the button function signal are set between the touch pen 100C and the optical touch panel device 200C. Therefore, the optical touch panel device 200C may prevent wrong recognition of an interference optical signal having the first pattern as the touch signal or the button function signal.

The timing controller 253 may change the scanning period of the optical touch panel 220 according to the change of the operation clock of the optical touch panel 220. The timing controller 253 may generate a synchronization signal according to the changed operation clock of the optical touch panel 220. The wireless transmitter 257 may transmit the synchronization signal to the wireless receiver 150 of the touch pen 100C so as to perform synchronization between the touch pen 100C and the optical touch panel device 200C.

The touch system 10C shown in FIG. 5 changes the optical signal pattern that is set between the touch pen 100C and the optical touch panel device 200C in advance, and thus, the interference optical signal having a similar pattern to that of the optical signal pattern may not be recognized, and thus, a touch system that is strong against external interference may be provided.

Figure 6:
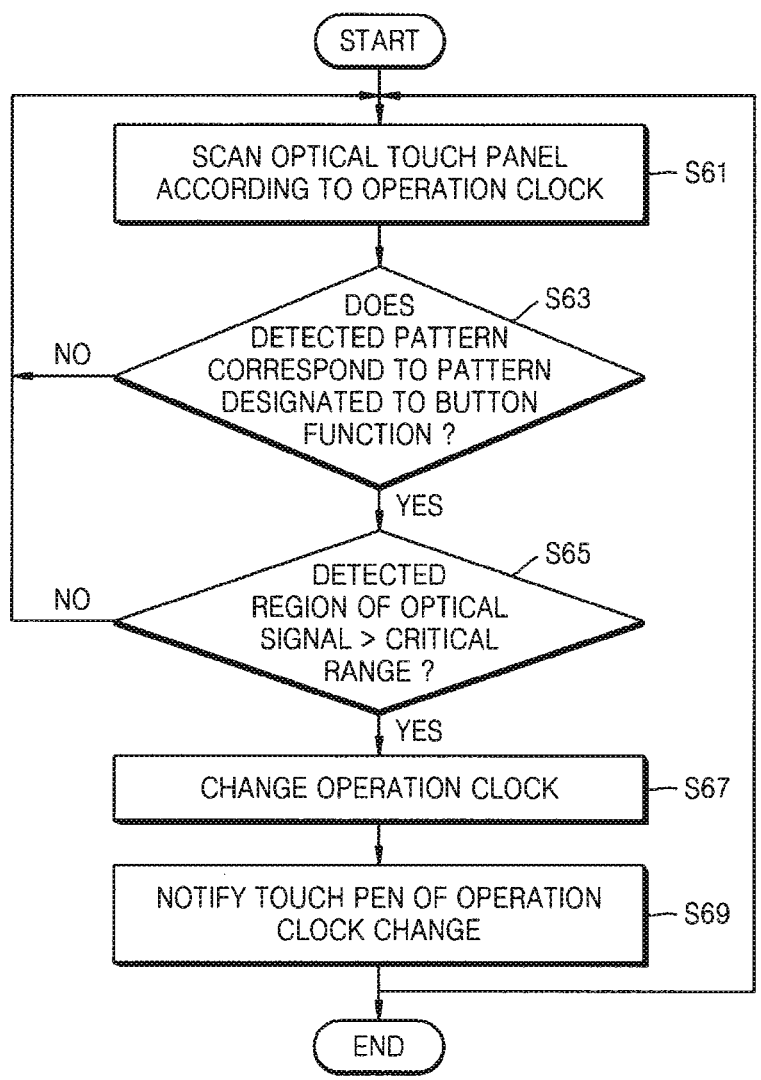
FIG. 6 is a flowchart schematically illustrating a method of controlling an interference optical signal in an optical touch panel device, according to an embodiment of the present invention.
Figure 7:
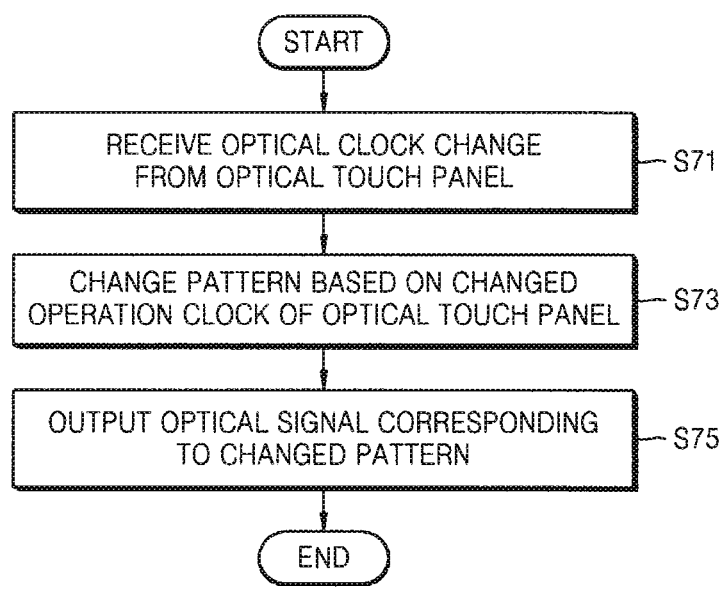
FIG. 7 is a flowchart schematically illustrating a method of controlling an interference optical signal of a touch pen, according to an embodiment of the present invention.

FIG. 6 is a flowchart schematically illustrating a method of controlling an interference optical signal in an optical touch panel device, according to an embodiment of the present invention, and FIG. 7 is a flowchart schematically illustrating a method of controlling an interference optical signal in a touch pen, according to an embodiment of the present invention. Hereinafter, the method of controlling the interference of a button function optical signal of the touch pen will be described as an example.

The optical touch panel device scans the optical touch panel during a scanning period based on an initially set operation clock of the optical touch panel (S61). The optical touch panel device detects a pattern of an optical signal from a photosensitive signal acquired by an optical sensor.

The optical touch panel device determines whether or not the detected pattern of the optical signal corresponds to each of the patterns designated for button functions of the touch pen (S63). The optical touch panel device may store information about the patterns designated to the button functions set with the touch pen in advance.

If the detected pattern corresponds to a first pattern that is designated to a certain button function of the touch pen in advance, the optical touch panel device determines the detected location of the optical signal as a touch location, and determines whether or not a detected region of the optical signal exceeds a critical range (S65).

If the detected region of the optical signal exceeds the critical range, the optical touch panel device determines the optical signal is an interference signal and changes an operation clock of the optical touch panel (S67). The scanning period of the optical touch panel may be changed due to the change of the operation clock of the optical touch panel.

The optical touch panel device notifies the touch pen of the change of the operation clock of the optical touch panel via a wireless channel, so that the touch pen may change the first pattern designated to a certain button function to a second pattern (S69).

Referring now to FIG. 7, the touch pen wirelessly receives the notification of the operation clock change from the optical touch panel device (S71).

The touch pen changes the first pattern designated to a certain button function to the second pattern based on the changed operation clock of the optical touch panel device (S73). The second pattern may have an optical signal output period that is an integer multiple greater than or equal to the scanning period, which is based on the changed operation clock of the optical touch panel, while the first pattern has an optical signal output period that is an integer multiple greater than or equal to the scanning period, which is based on the operation clock of the optical touch panel before being changed. The touch pen may change the patterns designated to other functions according to the scanning period according to the changed operation clock of the optical touch panel.

The touch pen outputs an optical signal corresponding to the second pattern to the optical touch panel so that the optical touch panel device may perform the function designated to the certain button function (S75).

The optical touch panel device and the touch pen are synchronized with the changed operation clock of the optical touch panel.

Figure 8:
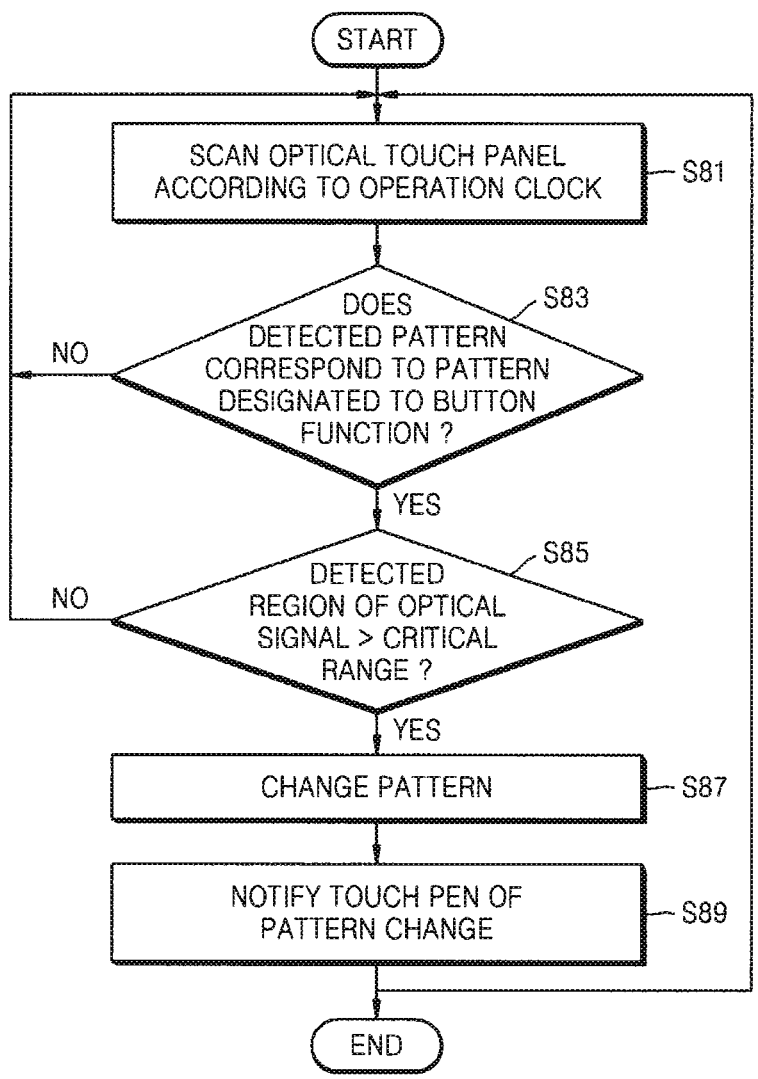
FIG. 8 is a flowchart schematically illustrating a method of controlling an interference optical signal in an optical touch panel device, according to another embodiment of the present invention.
Figure 9:
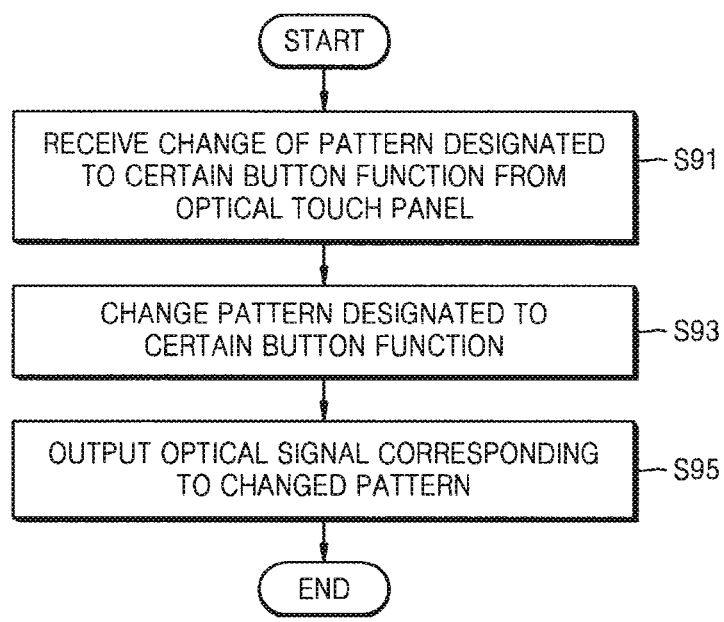
FIG. 9 is a flowchart schematically illustrating a method of controlling an interference optical signal in a touch pen, according to another embodiment of the present invention.

FIG. 8 is a flowchart schematically illustrating a method of controlling an interference optical signal in an optical touch panel device, according to another embodiment of the present invention, and FIG. 9 is a flowchart schematically illustrating a method of controlling an interference optical signal in a touch pen, according to another embodiment of the present invention. Hereinafter, the method of controlling the interference of the button function optical signal in the touch pen will be described below.

The optical touch panel device scans the optical touch panel during a scanning period according to an initially set operation clock of the optical touch panel (S81). The optical touch panel device may detect a pattern of an optical signal from a photosensitive signal acquired by an optical sensor.

The optical touch panel device determines whether or not the detected pattern of the optical signal corresponds to each of the patterns designated for button functions of the touch pen (S83). The optical touch panel device may store information about the patterns designated to the plurality of button functions set with the touch pen in advance.

If the detected pattern corresponds to a first pattern designated to a certain button function of the touch pen, the optical touch panel device determines the detected location of the optical signal as a touch location, and determines whether or not the detected region of the optical signal exceeds a critical range (S85).

If the detected region of the optical signal exceeds the critical range, the optical touch panel device determines the optical signal as an interference signal and changes the first pattern to a second pattern that is unused (S87).

The optical touch panel device may notify the touch pen of the pattern change via a wireless channel so that the touch pen may change the first pattern designated to a certain button function to the second function (S89).

Referring now to FIG. 9, the touch pen may wirelessly receive the notification of the change of the pattern designated to the button function from the optical touch panel device (S91).

Like the pattern change of the optical touch panel device, the touch pen changes the first pattern designated to the certain button function to the second pattern (S93). The second pattern is a pattern that is not designated to any other button functions of the touch pen.

The touch pen outputs an optical signal corresponding to the second pattern to the optical touch panel so that the optical touch panel device may perform a function designated to the certain button function (S95).

According to an embodiment of the present invention, a signal generator is included in the optical touch pen including a light-emitting device so as to output an optical signal in a certain signal pattern that is set in advance. The optical signal is input to the optical touch panel, and the optical touch panel recognizes the optical signal as a touch in a case where the pattern of the optical signal is the same as a certain signal pattern that is designated in advance in the driving IC of the optical touch panel. Thus, a cursor may be moved and a certain button function may be used while diversifying signal patterns.

Also, when designing the optical touch pen for the optical touch panel, certain signals are included as the optical signals so that interference or wrong operation caused by peripheral external light may not occur, and a signal corresponding to pushing a button of the optical touch pen may be transmitted by changing the kinds of the certain signal (or pattern) included in the optical signal. Accordingly, functions such as pointing, touching, and other functions may be performed only by the optical signals without an additional channel.

According to the present invention, the touch system that is not affected by external and internal light may be provided by excluding the sensing of an interference optical signal. Also, the pointing, the touch, and button functions may be performed by the optical signal without an additional channel such as a wire or an RF signal. In addition, if the touch system is configured as a synchronization type, a universal optical touch pen may be applied to different kinds of optical touch panels.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. An optical touch panel device comprising:
   a pattern analyzer configured to detect a pattern of an optical signal by scanning an optical touch panel and comparing a detected pattern with patterns designated to button functions of a touch pen;
   a touch location detector configured to recognize a detected location of the optical signal as a touch location when the detected pattern corresponds to a first pattern designated to a button function;
   an interference controller configured to determine whether or not the optical signal is an interference signal when a detected region of the optical signal exceeds a critical range; and
   a wireless transmitter configured to output a control signal to the touch pen so that the touch pen may change the first pattern designated to the button function to a second pattern.

2. The optical touch panel device of claim 1,
wherein the interference controller is configured to change an operation clock of the optical touch panel when the optical signal is determined as the interference signal, and
wherein the wireless transmitter is configured to output a notification of an operation clock change of the optical touch panel as the control signal.

3. The optical touch panel device of claim 1,
wherein the interference controller is configured to change the first pattern to the second pattern when the optical signal is determined as the interference signal, and
wherein the wireless transmitter is configured to output a pattern change notification as the control signal.

4. The optical touch panel device of claim 1, wherein the first pattern and the second pattern have an optical signal output period that is an integer multiple greater than or equal to a scanning period corresponding to an operation clock of the optical touch panel.

5. The optical touch panel device of claim 1, wherein the wireless transmitter is configured to output a synchronization signal, which comprises information about an operation clock of the optical touch panel, to the touch pen to perform synchronization with the touch pen.

6. A touch pen comprising:
a wireless receiver configured to receive a control signal from an optical touch panel requesting change of a first pattern, which corresponds to a pattern of an optical signal that is determined as an interference signal in an optical touch panel, designated to a button function to a second pattern;
a pattern generator configured to change the first pattern designated to the button function to the second pattern according to the control signal; and
a light-emitting device configured to generate an optical signal corresponding to the second pattern so that the optical touch panel performs the button function.

7. The touch pen of claim 6,
wherein the wireless receiver is configured to receive a notification of an operation clock change of the optical touch panel as the control signal, and
wherein the pattern generator is configured to generate the second pattern according to the changed operation clock of the optical touch panel.

8. The touch pen of claim 6,
wherein the wireless receiver is configured to receive a notification of the change of the pattern designated to the button function as the control signal from the optical touch panel, and
wherein the pattern generator is configured to change the first pattern designated to the button function to the second pattern.

9. The touch pen of claim 6, wherein the first pattern and the second pattern have an optical signal output period that is an integer multiple greater than or equal to a scanning period corresponding to an operation clock of the optical touch panel.

10. The touch pen of claim 6, wherein the wireless receiver is configured to receive a synchronization signal, which comprises information about an operation clock of the optical touch panel, from the optical touch panel in order to perform synchronization with the optical touch panel.

11. A method of controlling an interference optical signal in an optical touch panel device, the method comprising:
detecting a pattern of an optical signal by scanning an optical touch panel and comparing a detected pattern of the optical signal to patterns designated to button functions of a touch pen;
recognizing a detected location of the optical signal as a touch location when the detected pattern corresponds to a first pattern designated to a button function;
determining the optical signal is an interference signal when a detected region of the optical signal exceeds a critical range; and
wirelessly outputting a control signal to the touch pen so that the touch pen changes the first pattern designated to the button function to a second pattern.

12. The method of claim 11,
wherein the determining of the interference signal comprises changing an operation clock of the optical touch panel when the optical signal is determined as the interference signal, and
wherein the outputting of the control signal comprises outputting an operation clock change notification of the optical touch panel as a control signal.

13. The method of claim 11,
wherein the determining of the interference signal comprises changing the first pattern to the second pattern when the optical signal is determined as the interference signal, and
wherein the outputting of the control signal comprises outputting a pattern change notification as the control signal.

14. The method of claim 11, wherein the first pattern and the second pattern have an optical signal output period that is an integer multiple greater than or equal to a scanning period corresponding to an operation clock of the optical touch panel.

15. The method of claim 11, further comprising wirelessly outputting a synchronization signal comprising information about an operation clock of the optical touch panel to the touch pen to perform synchronization with the touch pen.

16. A method of controlling an interference optical signal in a touch pen, the method comprising:
wirelessly receiving a control signal requesting a change of a first pattern, which corresponds to a pattern of an optical signal that is determined as an interference signal in an optical touch panel, designated to a button function to a second pattern from the optical touch panel;
changing the first pattern designated to the button function to the second pattern according to the control signal; and
generating an optical signal corresponding to the second pattern so that the optical touch panel performs the button function.

17. The method of claim 16,
wherein the receiving of the control signal comprises receiving an operation clock change notification of the optical touch panel from the optical touch panel, and
wherein the changing of the pattern comprises generating the second pattern according to the changed operation clock of the optical touch panel.

18. The method of claim 16,
wherein the receiving of the control signal comprises receiving a change notification of the pattern designated to the button function from the optical touch panel, and
wherein the changing of the pattern comprises changing the first pattern designated to the button function to the second pattern.

19. The method of claim 16, wherein the first pattern and the second pattern have an optical signal output period that is an integer multiple greater than or equal to a scanning period that is based on an operation clock of the optical touch panel.

20. The method of claim 16, further comprising receiving a synchronization signal comprising information about an operation clock of the optical touch panel from the optical touch panel in order to perform synchronization with the optical touch panel.

* * * * *